(12) United States Patent
Bennett et al.

(10) Patent No.: US 7,673,299 B2
(45) Date of Patent: *Mar. 2, 2010

(54) SYSTEM AND METHOD FOR DYNAMICALLY VERIFYING THE COMPATIBILITY OF A USER INTERFACE RESOURCE

(75) Inventors: Julie D Bennett, Medina, WA (US); Yung-Shin Lin, Sammamish, WA (US); Shenghua Ye, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 945 days.

This patent is subject to a terminal disclaimer.

(21) Appl. No.: 11/444,800

(22) Filed: May 31, 2006

(65) Prior Publication Data

US 2006/0225068 A1 Oct. 5, 2006

Related U.S. Application Data

(63) Continuation of application No. 10/020,341, filed on Oct. 29, 2001, now Pat. No. 7,178,142.

(60) Provisional application No. 60/244,338, filed on Oct. 30, 2000.

(51) Int. Cl.
*G06F 9/44* (2006.01)
*G06F 9/445* (2006.01)
*G06F 17/28* (2006.01)
(52) U.S. Cl. .................. 717/168; 717/174; 715/264
(58) Field of Classification Search .............. 717/168, 717/174; 715/264

See application file for complete search history.

(56) References Cited

U.S. PATENT DOCUMENTS

| | | | | |
|---|---|---|---|---|
| 4,558,413 A | * | 12/1985 | Schmidt et al. | 707/203 |
| 5,577,244 A | * | 11/1996 | Killebrew et al. | 717/169 |
| 5,613,101 A | | 3/1997 | Lillich | |
| 5,634,114 A | | 5/1997 | Shipley | |
| 6,252,589 B1 | | 6/2001 | Rettig et al. | |
| 6,591,417 B1 | * | 7/2003 | Strysniewicz et al. | 717/168 |
| 6,807,558 B1 | | 10/2004 | Hassett et al. | |
| 2004/0155896 A1 | * | 8/2004 | Miller et al. | 345/700 |

FOREIGN PATENT DOCUMENTS

EP 0 559 221 A2 9/1993

OTHER PUBLICATIONS

"UName," *Wikepedia, the Free Encyclopedia*, n. d., <http://en.wikipedia.org/wiki/Uname> [retrieved Feb. 2, 2006].

* cited by examiner

*Primary Examiner*—Wei Y Zhen
*Assistant Examiner*—Chih-Ching Chow
(74) *Attorney, Agent, or Firm*—Workman Nydegger

(57) ABSTRACT

In a computer operating system having a user interface, a resource loader, and a registry resource database, a method for dynamically verifying whether the resource content of a resource module is compatible with the most current version of the operating system. Upon obtaining a request for a resource, the resource loader verifies that the resource modules remain compatible with the operating system prior to loading a resource from an alternate resource module. In accordance with one embodiment of the present invention, the operating system has a multilingual user interface and utilizes resource modules that are language specific.

10 Claims, 5 Drawing Sheets

SYSTEM AND METHOD FOR DYNAMICALLY VERIFYING THE COMPATIBILITY OF A USER INTERFACE RESOURCE

CROSS-REFERENCE(S) TO RELATED APPLICATIONS

This application is a continuation of U.S. patent application Ser. No. 10/020,341, filed Oct. 29, 2001, which claims the benefit of U.S. provisional patent application Ser. No. 60/244,338, filed Oct. 30, 2000.

BACKGROUND

Distributing software in a global marketplace requires a user interface that is accessible to a variety of users. Generally, an interface is the point at which a connection is made between two elements so that they can work with each other or exchange information. For computer software purposes, an interface is typically software that enables a program to work with the user, another program including an operating system, and the computer's hardware. An interface that enables a program to work with a user is called a user interface and can be a command-line interface, menu-driven, or a graphical user interface.

For example, to facilitate use of the common user interface in different countries/regions, the user interface should support multiple languages. In the simplest form, a software provider can provide multiple-language user interfaces by manually customizing the user interface software code to satisfy the specific language requirements of each supported language. This approach is generally inefficient, however, in that the software provider must maintain separate software code bases for each of the supported languages. Accordingly, the software provider must independently support each separate software code base, such as providing technical support, providing updates, and/or providing patches.

Another approach for facilitating the use of a common user interface in different countries/regions involves providing an operating system with a common user interface software code base in conjunction with various language-specific resource libraries. One such system is Microsoft Corporation's multilingual user interface ("MUI"). Under the MUI approach, the operating system maintains a common user interface code base, a default language resource module, and a number of alternate language-specific resource modules for displaying some or all of the user interface objects in an alternate language. For example, if the user selects Spanish as a desired language, the operating system loads the system resources from a Spanish-specific resource module.

Computer operating systems typically provide a variety of functions to software applications running within the operating system by referring to various resource library files. An operating system often maintains a number of resource modules, with each resource module consisting of resources that are used by the operating system to perform particular tasks. Generally described, a resource is an item of data or code that is shared by multiple programs or in more than one place in a program, such as a dialog box, a sound effect, or a font in a windowed environment. Many features in a program can be altered by adding or replacing resources without modifying the program's source code. Resource data usually consists of the data structures, templates, definition procedures, management routines, icon maps, and so forth associated with a particular resource, such as a menu, window, or dialog box.

In a specific implementation of an MUI-based operating system, the operating system includes a resource loader that obtains and loads resources from the desired language-specific resource module. The resource loader selects between loading resources from a default resource module, typically encoded in English, or from a designated language-specific alternate resource module. Typically, if a desired alternate resource module is unavailable, the resource loader selects the default resource module.

It will be appreciated by one skilled in the relevant art that operating system resource modules may be periodically updated. Typically, the operating system updates are identified by version number that allows for the determination of which updates have been applied. For example, an original operating system resource module may be identified by a version number, such as "version 5.0". As the operating system resource modules are updated, the updated resource module (which includes resource information) would be labeled "version 5.2." However, one skilled in the relevant art will appreciate that a resource module update may not necessarily modify the resources contained within the resource. Additionally, because an operating system may utilize a large number of resource modules, most operating system updates are at least initially limited to updating only the version of the default resource modules and not each alternate resource module.

In the above-described example of an MUI-based operating system having a resource loader, the resource loader generally must verify whether a resource to be loaded from an alternate resource module is compatible with the most current version of the operating system. In a conventional MUI-based operating system, this is accomplished by comparing the version information of the alternate resource module with the current version of the operating system. For example, if a resource loader receives a request to load a resource from an alternate resource module having a version label of "3.0", while the default operating system resource modules have been updated to a version label of "3.3", the resource loader will not load the resource from the alternate resource module because it assumes that the alternate resource module is not compatible with the current version of the operating system. Thus, the resource loader defaults to loading resources from the updated default resource module. Consequently, the MUI functionality is reduced because the operating system returns to the default language after the upgrade, even though the alternate resource module resources may still be valid.

Accordingly, there exists a need for a system and method to dynamically verify the compatibility of resource modules when operating system upgrades are implemented, for continued MUI functionality.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In a computer operating system having a user interface, a resource loader, and a registry resource database, a method is provided for dynamically verifying whether the resource content of a resource module is compatible with the most current version of the operating system. Upon obtaining a request for a resource, the resource loader verifies that the resource modules remain compatible with the operating system prior to loading a resource from an alternate resource module. In accordance with one embodiment of the present invention, the operating system has a multilingual user interface and utilizes resource modules that are language specific.

In accordance with the present invention, a method for dynamically verifying resource compatibility with an operating system is provided. In accordance with the method, a resource loader obtains a request to load a resource from an alternate resource module, where the alternate resource module corresponds to a specific interface. The resource loader obtains the resource content of the default resource module from which the alternate resource module was localized. The resource loader obtains the resource content of the current default resource module. The resource loader compares the resource content of the default resource module from which the alternate resource module was localized with the resource content of the current default resource module. If the resource content of the default resource module from which the alternate resource module was localized is the same as the resource content of the current default resource module, the resource loader loads the alternate resource module.

In accordance with another aspect of the present invention, a computer system is provided for dynamically verifying that a resource module is compatible with a current version of an operating system. The computer system includes a resource loader for loading a resource from a resource module, a default resource module containing at least one resource, an alternate resource module containing one or more resources localized from a default resource module, and a unique number that represents the resource content of the default resource module from which the alternate resource module was localized. This unique number can include a checksum. The resource loader loads a resource from the alternate resource module when the resource content from which the alternate resource module was localized is the same as the resource content of the current default resource module. In accordance with additional aspects of the present invention, a computer-readable medium having a computer-executable module for dynamically verifying that a resource is compatible with a current version of an operating system is provided.

Thus, the invention provides a system and method for dynamically verifying resource compatibility with an operating system. In accordance with the preferred embodiment, the operating system has a multilingual user interface and the resource modules are language specific.

DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

Figure 3:
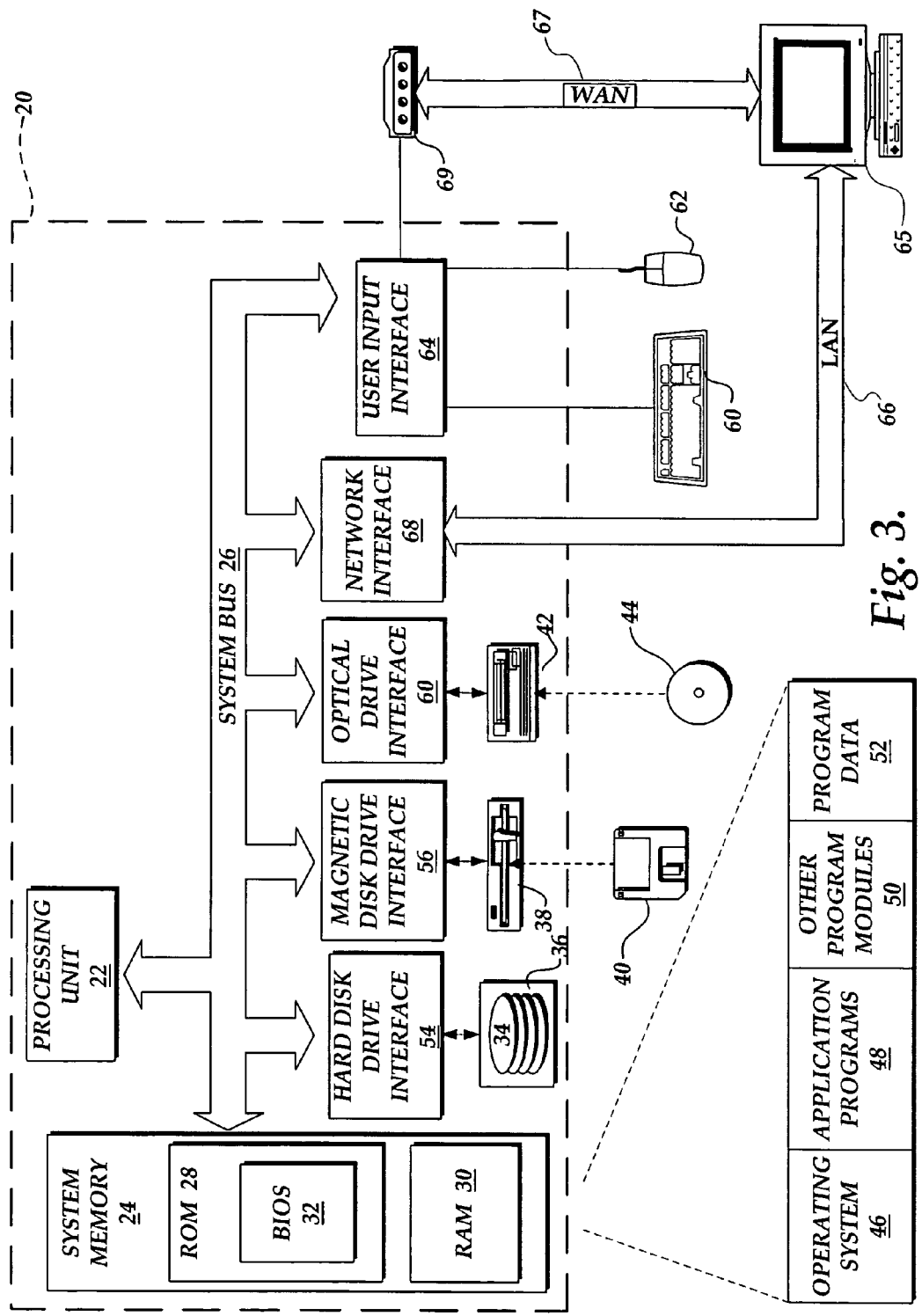
FIG. 3 is a block diagram illustrative of a suitable computing system environment in which the invention may be implemented.

FIG. 3 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependency requirement relating to any one or combination of components illustrated in the exemplary operating environment.

The invention is operational in numerous other general-purpose or special computing system environments or configurations. Examples of well known computing systems, environments, and/or configurations that may be suitable for implementing the invention include, but are not limited to, personal computers, server computers, laptop devices, multiprocessor systems, microprocessor-based systems, network PCs, minicomputers, mainframe computers, distributed computing environments that include any of the above systems, or the like.

The invention may be described in the general context of computer-executable instructions, such as program modules, being executed by a computer. Generally, program modules include routines, programs, objects, components, data structures, etc. that perform a particular task or implement particular abstract data types. The invention may also be practiced in distributed computing environments where tasks are performed by remote processing devices that are linked through a communications network. In a distributed computing environment, program modules may be located in both local and remote computer storage media, including memory storage devices.

With reference to FIG. 3, an exemplary system for implementing the invention includes a general-purpose computing device in the form of a computer 20. Components of a computer 20 include, but are not limited to, a processing unit 22, a system memory 24, and a system bus 26 that couples various system components, including the system memory, to the processor. The system bus may be any of several types of bus structures including a memory bus or memory controller, peripheral bus, and a local bus using any of a variety of bus architectures. By way of example, not limitation, such architectures include Industry Standard Architecture (ISA) normal capitalization bus, Micro Channel Architecture (MCA) bus, Enhanced ISA (EISA) bus, Video Electronics Standards Association (VESA) local bus, and Peripheral Component Interconnect (PCI) bus, also known as a Mezzanine bus.

The computer 20 typically includes a variety of computer-readable media. Computer-readable media can be any available media that can be accessed by the computer 20 and include both volatile and nonvolatile media, removable and nonremovable media. By way of example, and not limitation, computer-readable media may comprise computer storage media and communication media. Computer storage media include, but are not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium that can be used to store the desired information and which can be accessed by the computer 20.

The communication media typically embody computer-readable instructions, data structures, program modules, or other data in a modulated data signal, such as a carrier wave or other transport mechanism, and include any information delivery media. The term "modulated data signal" means a signal that has one or more of its characteristics set or changed in such a manner to encode information in the signal. By way of example, and not limitation, communication media include wired media, such as a wired network or direct wired connection, and wireless media, such as acoustic, RF, infrared, and other wireless media. Combinations of any of the above should also be included within the scope of computer-readable media.

The system memory 24 includes computer storage media in the form of volatile and/or nonvolatile memory, such as read-only memory (ROM) 28 and random-access memory (RAM) 30. A basic input/output system 32 (BIOS), containing the basic routines that help to transfer information between elements within the computer 20, such as during startup, is typically stored in ROM 28. RAM 30 typically contains data and/or program modules that are immediately accessible to and/or presently being operated on by the processing unit 22. By way of example, and not limitation, FIG. 3 illustrates an operating system 46, application programs 48, other program modules 50, and program data 52.

The computer 20 may also include removable/nonremovable, volatile/nonvolatile computer storage media. By way of example only, FIG. 3 illustrates a hard disk drive 36 that reads from or writes to nonremovable, nonvolatile magnetic media 34, a magnetic drive 38 that reads from or writes to a removable, nonvolatile magnetic disk 40, and an optical disk drive 42 that reads from or writes to a removable, nonvolatile optical disk 44, such as CD-ROM or other optical media. Other removable/nonremovable, volatile/nonvolatile computer storage media that can be used in the exemplary operating environment include, but are not limited to, magnetic tape cassettes, flash memory cards, DVD, digital videotape, Bernoulli cap cartridges, solid state RAM, solid state ROM, and the like. The hard disk drive 36, magnetic disk drive 38, and optical disk drive 42 may be connected to the system bus 26 by a hard disk drive interface 54, a magnetic disk drive interface 56, and an optical drive interface 60, respectively. Alternatively, the hard disk drive 34, magnetic disk drive 38, and optical disk drive 42 are typically connected to the system bus 26 by a Small Computer System Interface (SCSI).

The drives and their associated computer storage media, discussed above and illustrated in FIG. 3, provide storage of computer-readable instructions, data structures, program modules and other data for the computer 20. In FIG. 3, for example, the hard disk drive 36 is illustrated as storing the operating system 46, application programs 48, other programs 50, and program data 52. Note that these components can either be the same as or different from the operating system 46, the other program modules 50, and the program data 52. A user may enter commands and information into the computer 20 through input devices such as a keyboard 60 and a pointing device 62, commonly referred to as a mouse, trackball, or touchpad. Other input devices (not shown) may include a microphone, a joystick, a game pad, a satellite dish, a scanner, or the like. These and other input devices are often connected to the processing unit 22 through user input interface 64 and may be connected by other interface and bus structures, such as a parallel port, game port, or other universal serial bus (USB).

The computer 20 may operate in a network environment using logical connections to one or more remote computers. The remote computer 65 may be a personal computer, a server, a router, a network PC, a peer device or other common network node, and typically includes many or all of the elements described above relative to the computer 20, although only a memory storage device has been illustrated in FIG. 3. The logical connections depicted in FIG. 3 include a local area network (LAN) 66 and a wide area network (WAN) 67, but also include other networks. Such network environments are commonplace in office, enterprise-wide computer networks, intranets, and the Internet. One skilled in the relevant art will appreciate that the computer 20 may be configured such that at least one network connection is noncontinuous. Accordingly, the computer 20 would be unable to communicate with the remote computer 65 throughout a period of time that the network connection is disabled. Such a configuration is described generally as an "off-line" configuration.

When used in a LAN network environment, the computer 20 is connected to the LAN 77 through a network interface adapter 68. When used in a WAN network environment, the computer typically includes a modem or other means for establishing communications over the WAN 67, such as the Internet. The modem, which may be internal or external, may be connected to the system bus 26 via the serial port interface or other appropriate mechanism. In a networked environment, program modules depicted relative to the computer 20, or portions thereof, may be stored in the remote memory storage device. By way of example, and not limitation, FIG. 3 illustrates remote application programs 48 as residing on memory device 24. It will be appreciated that the network connections shown are exemplary and other means of establishing communication between the computers may be used. Although many other internal components of the computer 20 are not shown, those of ordinary skill will appreciate that such components and their interconnection are well known. Accordingly, additional details concerning the internal construction of the computer 20 need not be disclosed in connection with the present invention.

Those skilled in the art will understand that program modules such as the operating system 46, the application programs 48, and data 52 are provided to the computer 20 via one of its memory storage devices, which may include ROM 28, RAM 30, hard disk drive 36, magnetic disk drive 38, or optical disk device 42. The hard disk drive 36 is used to store data 52 and the programs, including the operating system 46 and application programs 48.

When the computer 20 is turned on or reset, the BIOS 32, which is stored in ROM 28, instructs the processing unit 22 to load the operating system from the hard disk drive 36 into the RAM 30. Once the operating system 46 is loaded into RAM 30, the processing unit executes the operating system code and causes the visual elements associated with the user interface of the operating system to be displayed on the monitor. When a user opens an application program 48, the program code and relevant data are read from the hard disk drive and stored in RAM 30.

The present application is directed toward a method and system for implementing a resource loader capable of dynamically verifying resource module compatibility with an operating system. Specifically, the present invention will be described in relation to a system and method for loading language-specific MUI resource sets of files, also called resource modules. As will be readily understood by one skilled in the relevant art, the present invention is not limited in its application to a dynamic MUI resource module loader. Thus, it is to be understood that the disclosed embodiment is only by way of example and should not be construed as limiting.

Figure 1:
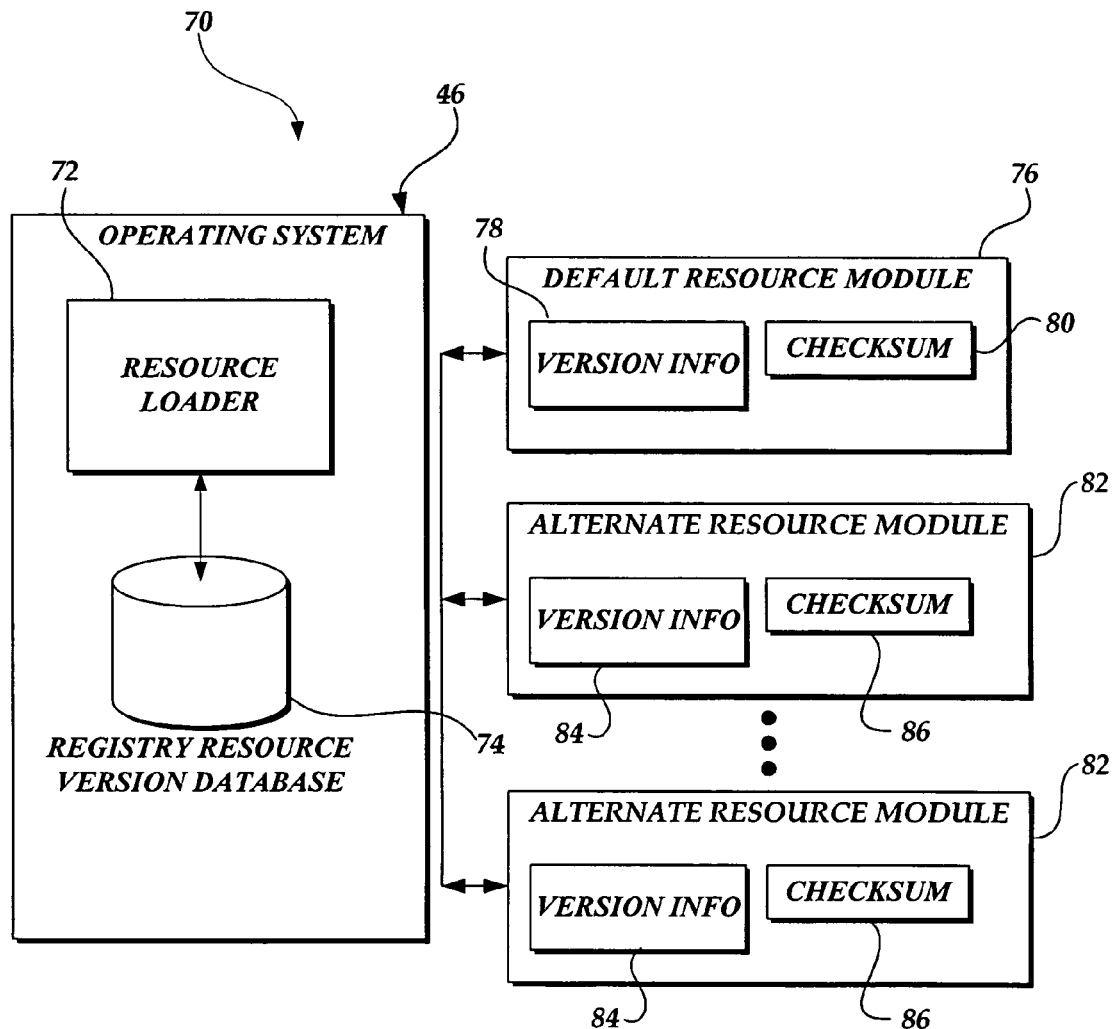
FIG. 1 is a block diagram of an illustrative resource loading system capable of dynamically verifying the compatibility of resource modules in accordance with the present invention.

FIG. 1 is a block diagram illustrative of a resource loading system 70 capable of dynamically verifying the compatibility of resources being loaded from a resource module, in accordance with the present invention. As illustrated in FIG. 1, the system 70 generally includes a resource loader 72, which is generally included as part of the operating system 46. The resource loader 72 has access to a registry resource version database 74 for tracking the version and location of the various operating system resources available. In one embodiment of the present invention, the registry resource version database 74 tracks the version information for a default resource module and one or more alternate resource modules. The registry resource version database 74 also tracks the version information of the default resource module with which the alternate resource module will work. The version information in the resource module is used to determine which resource module should be loaded.

While one embodiment of the present invention uses the registry resource version database 74 for tracking and determining resource compatibility, those skilled in the relevant art will appreciate that many different methods for tracking resource compatibility may be utilized without departing from the scope of the present invention. Again, the present invention is not limited to any particular manner of tracking resource compatibility. For example, the present invention may be practiced by tracking resource compatibility utilizing different types of databases, such as hierarchical and relational databases, as well as different formats for database records. Additionally, the present invention may be practiced by tracking resource compatibility in a manner that does not use a database, such as storing compatibility information in the resource modules themselves.

In accordance with one embodiment of the present invention, the registry resource version database 74 includes a record containing an application name field, an alternate resource module version field, a default resource module version field, and a resource compatibility field that can be searched utilizing indices on key fields. Other embodiments of the present invention may utilize different formats for records in the registry resource version database 74. For example, the present invention may be practiced using a record format having a different number of fields, different types of data stored in each field, and different names for the fields.

As illustrated in FIG. 1, the resource loader 72 also communicates with a default resource module 76. In one embodiment of the present invention, a default resource module 76 generally includes default resource content code and a variety of resources including data structures, templates, definition procedures, management routines, icon maps, and so forth associated with a particular resource, such as a menu, window, or dialog box, and is typically in English. Alternatively, the resource content of the default resource module may consist of data only or code only. The default resource module 76 also includes an identifier including the version information 78 of the operating system version with which the default resource module 76 is compatible. Additionally, in one embodiment of the present invention, the default resource module 76 includes a unique number that represents and identifies the resource content contained within the default resource module 76. For example, in one embodiment the unique numerical identifier is a checksum 80 of the resource contents within the module. According to one embodiment of the present invention, the checksum is based only on the resource content of a resource module. During the generation of the checksum, code and version information are excluded in the generation process, because a resource module may be updated with changes to its code or version number without any change to the resource content.

In an illustrative embodiment of the present invention, a hashing routine is utilized to provide a unique numerical identifier of the contents of the resource files. Hashing is the process of mapping information to a numerical value by a transformation known as a hashing function. A hash total can be used as an error-checking value derived from the addition of a set of numbers taken from data (not necessarily numeric data) that is to be processed or manipulated in some way. After processing, the hash total is recalculated and compared with the original total. If the two do not match, the original data has been changed in some way. The values returned from a hashing routine are generally described as checksums.

In one embodiment of the present invention, an MD5-message digest hashing algorithm is utilized to generate checksums. The MD5-message digest algorithm takes as input a message of arbitrary length and produces as output a 128-bit fingerprint or message digest of the input. The MD5-message digest algorithm is well known to those of ordinary skill in the art and will not be described in further detail. It will be readily understood by one skilled in the relevant art that any one of a variety of hashing routines for representing and comparing different resources may be practiced with the present invention. It will also be understood by one skilled in the art that different ways of representing and comparing different resources may be practiced with the present invention.

With continued reference to FIG. 1, the resource loader 72 additionally communicates with one or more alternate resource modules 82. An alternate resource module contains resource content that has been localized from a default resource module 76. Generally described, localization is the process of altering a program so that it is appropriate for the area in which it is used. With reference to multiple-language localization, the developers of a program must localize the program for different countries or languages because the characters in one language might be incorrect in another.

The alternate resource modules 82 also include version information 84 and information representing the resource content of the default resource module 76 from which the alternate resource modules 82 were localized. In one embodiment of the present invention, the alternate resource modules 82 include a checksum 86 of the default resource module 76. In an illustrative embodiment of the present invention, the alternate resource modules 82 do not contain binary executable code and contain only localized resource information, version information 84, and the resource content of the default resource module from which they were localized. As will be readily understood by one skilled in the relevant art, alternative system configurations are considered to be within the scope of the present invention.

Generally described, in an MUI-based operating system, a designated user interface language is specified and the resource loader attempts to load some or all resources from corresponding alternate resource modules 82. According to the present invention, the resource loader 72 obtains a call for a resource. Prior to loading the resource, resource loader 72 verifies that the resource in the alternate resource module is compatible with the operating system 46. If the version information 78 of the default language-specific resource module 76 matches the version information 84 of the alternate language-specific resource modules 82, the resource loader 72 loads the resource from the alternate language-specific modules 82. However, if the version information does not match, the resource loader dynamically determines whether the default resource content from which the desired alternate resource module was localized is the same as the most current default resource content. Specifically, the resource loader 72 compares the checksum of the resource content of the current default resource module with the checksum of the default resource module that the alternate resource module was localized from.

Figure 2A:
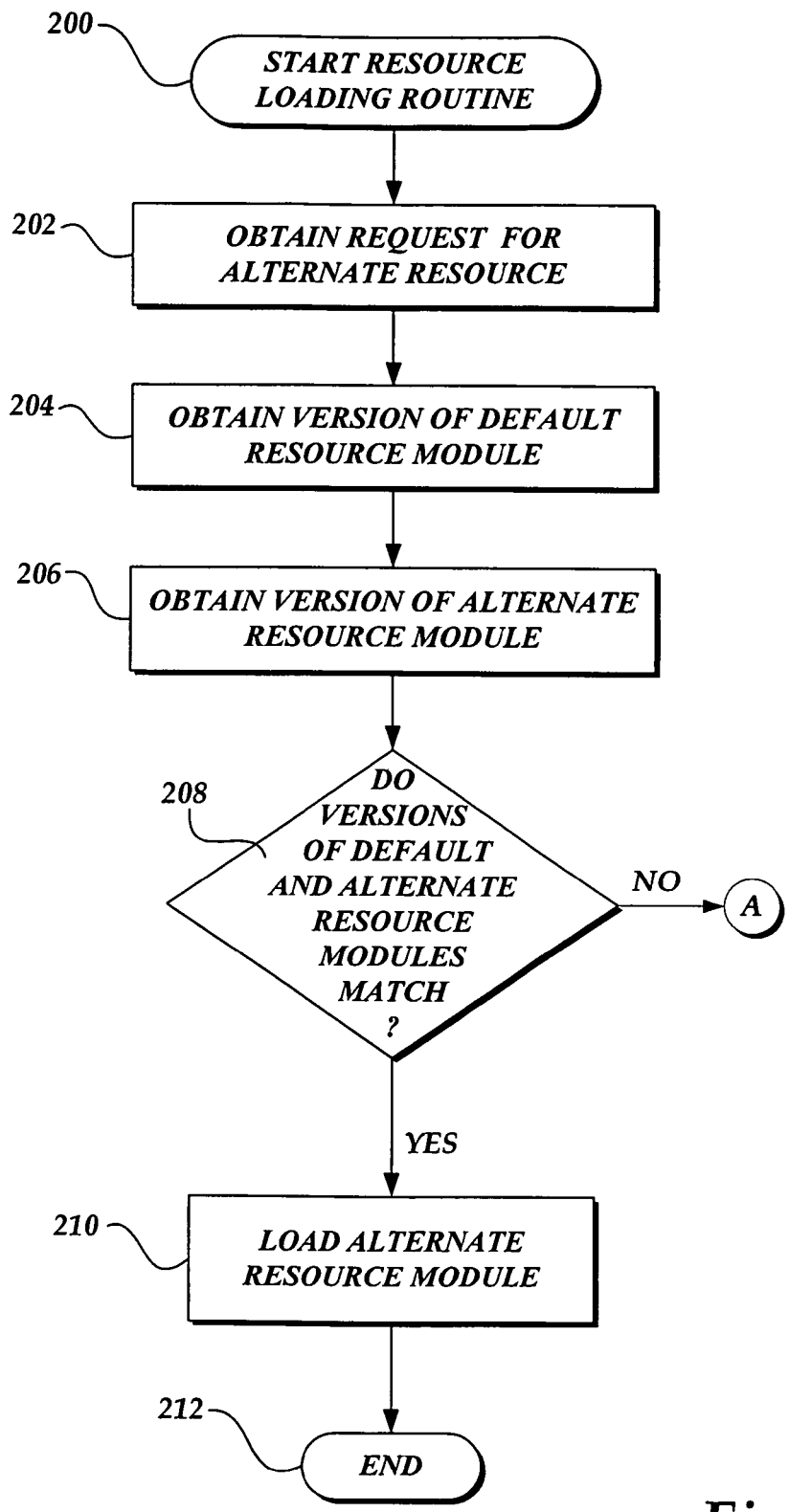
FIGS. 2A, 2B, and 2C are flow diagrams of a resource loading process capable of dynamically verifying the compatibility of resource modules in accordance with the present invention.
Figure 2B:
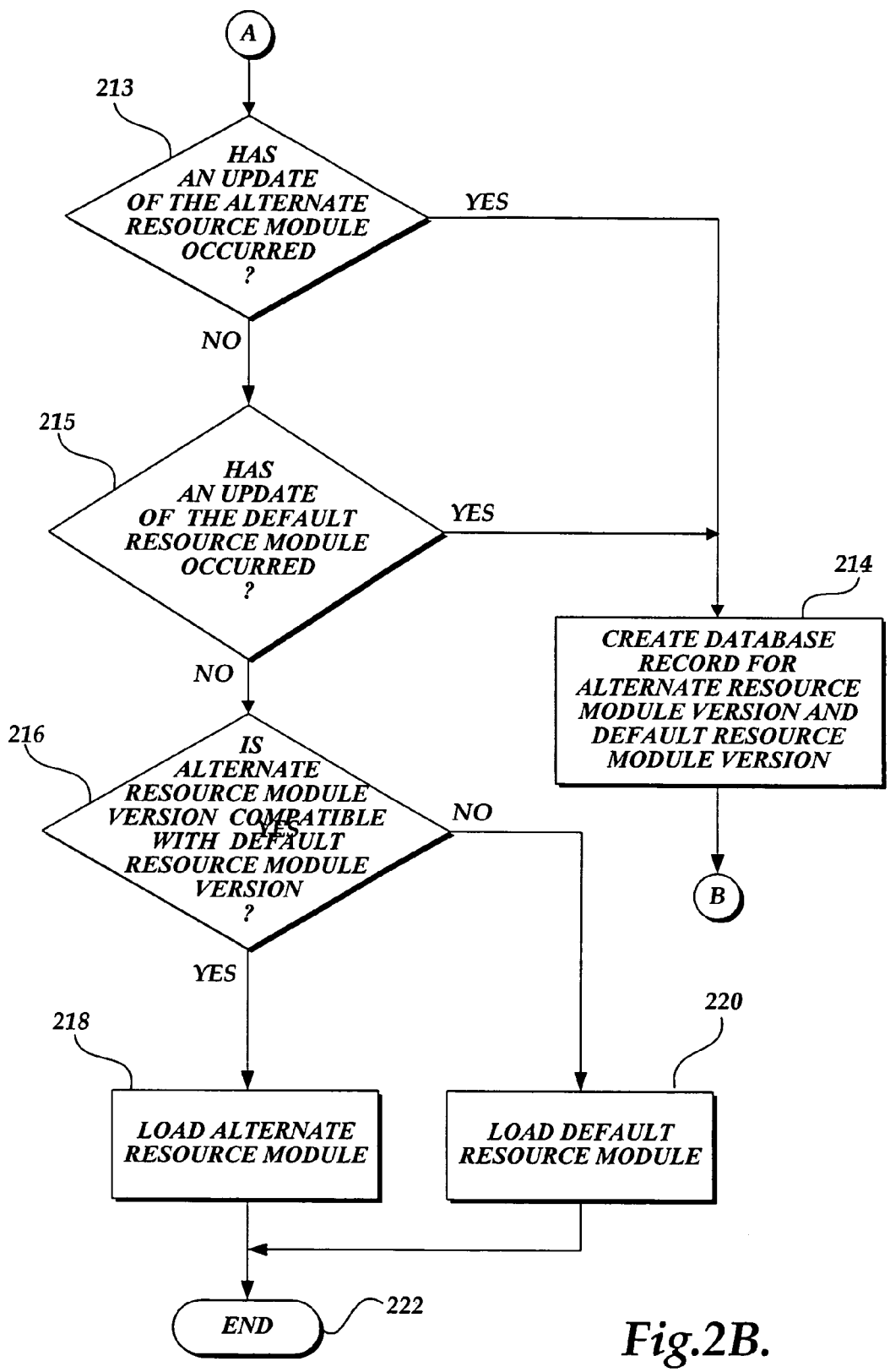
Figure 2C:
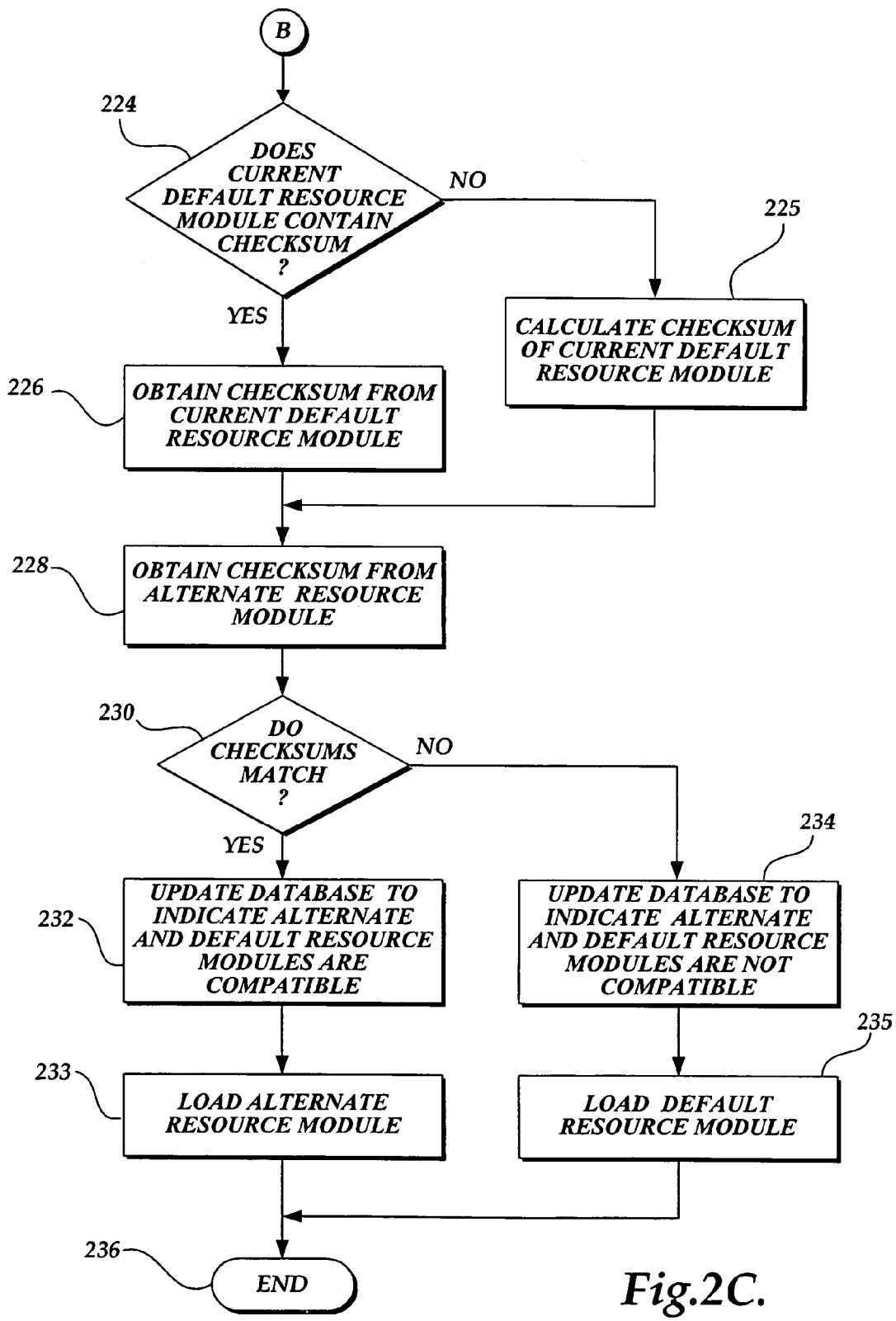

FIGS. 2A, 2B, and 2C are flow diagrams of a dynamic resource compatibility verification and loading routine 200 in accordance with the present invention. In one embodiment of the present invention, the routine 200 verifies resource compatibility in two ways. With reference to FIG. 2C, both the default resource module 76 and the alternate resource modules 82 contain checksum information that quantifies the contents of the resources contained within each module. In the case of the alternate resource modules 82, the checksum 86 quantifies the resource contents of the default resource module from which they were localized. In the case where the default resource module does not contain the checksum information, additional processing should occur at block 225.

Referring to FIG. 2A, at block 202, the resource loader 72 obtains a request for an alternate resource. According to one embodiment of the present invention, the alternate resource corresponds to a user-selected interface language and the alternate resources are language-specific. At block 204, the resource loader 72 obtains version information 78 from the default resource module 76. At block 206, the resource loader obtains version information 84 from the corresponding alternate resource modules 82. At decision block 208, a test is performed to determine whether the default resource module version information matches the alternate resource module version information. If the version information does match, the resources included in the alternate resource module are considered to be compatible with the current operating system's user interface. At this point, the resource loader 72 loads the requested alternate resource module at block 210 and routine 200 terminates at block 212. Because no changes in the version numbers of the default and alternate resource modules were found, no updates were applied and no further processing is necessary to verify that the resources are compatible.

If at decision block 208 it was determined that the version information did not match, then routine 200 proceeds to decision block 213 (FIG. 2B), which will be explained below. One skilled in the relevant art will appreciate that conventional resource loading routines would merely load the resource from a default resource module at this point. FIG. 2B illustrates one embodiment of the present invention where the resource loader 72 dynamically verifies the resource compatibility utilizing the registry resource database 74 when the version information of the resources does not match. Referring to FIG. 2B, at decision block 213, a determination is made as to whether or not the alternate resource modules 82 have been updated since the last time routine 200 was completed. In further accordance with one embodiment of the present invention, an update of the alternate resource modules 82 is detected by determining whether or not the registry resource version database 74 contains a record for the version of the alternate resource modules 82. To facilitate searching, the resource loader 72 can use an index on the registry resource version database 74 where the version number of the alternate resource module is a key field. If the registry resource version database 74 contains a record for the version of the alternate resource modules 82, then no update has occurred since the last time routine 200 was completed. Otherwise, if the registry resource version database 74 does not contain a record for the version of the alternate resource modules 82, then the alternate resource modules 82 were updated since the last time routine 200 was completed. If, at block 213, no record for the version of the alternate resource modules 82 was found in the registry resource version database 74, then at block 214, a new record is created in the registry resource version database 74 for tracking the compatibility of the version of the alternate resource modules 82 and the version of the default resource module 76 and routine 200 proceeds to FIG. 2C to obtain compatibility information.

On the other hand, if a record for the version of the alternate resource modules 82 was found in the registry resource version database 74 at block 213, then routine 200 proceeds to block 215.

At decision block 215 a determination is made as to whether or not the default resource module 76 has been updated since the last time routine 200 was completed. In accordance with one embodiment of the present invention, the resource loader 72 detects an update of the default resource module by determining whether or not the registry resource version database 74 contains a record for the version of the default resource module 76. To facilitate searching, the resource loader 72 can use an index on the registry resource version database 74 where the version of the default resource module is a key field. If the registry resource version database 74 contains a record for the version of the default resource module 76, then the default resource module has not been updated since the last time routine 200 was completed. Otherwise, if the registry resource version database 74 does not contain a record for the version of the default resource module 76, then routine 200 proceeds to block 214, where a new record is created for the version of the alternate resource modules 82 and the version of the default resource module 76 in the registry resource version database 74.

If at decision blocks 213 and 215, shown in FIG. 2B, it was determined that the registry resource version database 74 contained compatibility information for the version of the alternate resource modules 82 and the current default resource module 76, then no resources were updated and routine 200 proceeds to decision block 216. At decision block 216 the resource loader 72 uses the compatibility information stored in the registry resource version database 74 to determine whether or not the version of the alternate resource modules 82 is compatible with the version of the default resource module 76. In accordance with one embodiment of the present invention, the resource compatibility information field in the registry resource version database 74 is a Boolean data type that can store true and false values. The compatibility information field is used to store a true value if the resource content of the current default resource module is compatible with the resource content of the default resource module from which the alternate resource module was localized. Similarly, the compatibility information field is used to store a false value if the resource content of the current default resource module is not compatible with the resource content of the default resource module from which the alternate resource module was localized. To determine resource compatibility, the resource loader 72 retrieves the compatibility information stored as a true or false value in the registry resource version database 74 for the version of the alternate resource modules 82 and the version of the default resource module 76.

If, at decision block 216 shown in FIG. 2B, the compatibility information retrieved from the registry resource version database 74 is evaluated as being true, then the current default resource module is compatible with the version of the alternate resource modules 82. In this case, where the resources are compatible, routine 200 proceeds to block 218 and the resource loader 72 loads the resource from the alternate resource modules 82. If at decision block 216, the compatibility information retrieved from the registry resource version database 74 is evaluated as being false, then the current default resource module is not compatible with the version of the alternate resource modules 82. In this case where the resources are not compatible, routine 200 proceeds to block 220 and the resource loader 72 loads the resource from the default resource module 76. After loading the resource from the appropriate resource module, routine 200 terminates at block 222.

If, at decision block 215 of FIG. 2B, an update to the resources was detected by determining that the registry resource version database 74 did not contain compatibility information for the version of the alternate resource modules 82 and the current default resource module 76, then routine 200 proceeds to FIG. 2C. FIG. 2C illustrates two ways to verify resource compatibility, according to one embodiment of the present invention. The process illustrated at block 226 is performed when the content verification information is contained within the current default resource module. Specifically, in one embodiment of the present invention, the content verification information is checksum 80 information.

Referring now to FIG. 2C, at decision block 224 a test is made to determine whether the content verification information is stored in the default resource module 76. If the checksum information is not stored in the default resource file, routine 200 proceeds to block 225. Block 225 illustrates the second of two ways to verify resource compatibility, in accordance with an embodiment of the present invention. The process illustrated in block 225 is performed when content verification information is not contained within the current default resource module. In this case, additional processing should occur to determine the resource content of the current default resource module 76, which is used for dynamic resource compatibility verification. In accordance with an actual embodiment of the present invention, the resource loader 72 calculates the checksum of the resource content of the most current default resource module 76.

If the checksum 80 information is stored in the default resource module 76, routine 200 proceeds to block 226, and the resource loader 72 obtains the default resource module checksum information 80. At block 228, the resource loader obtains the alternate resource module checksum 84 information. At decision block 230, a test is conducted to determine whether the checksums match. If the checksums match, routine 200 proceeds to block 232, where the registry resource version database 74 is updated to indicate that the resource content of the current default resource module is compatible with the resource content of the default resource module from which alternate resource modules 82 were localized. In accordance with one embodiment of the present information, the compatibility information for the version of the alternate resource modules 82 and the version of the default resource module 76 is stored as a true value in the registry resource version database 74. In this way, routine 200 can use the compatibility information for the version of the alternate resource modules 82 and the version of the default resource module 76 stored in the registry resource version database 74 whenever the same versions of default resource module 76 and alternate resource modules 82 are thereafter loaded. After updating the compatibility information in the registry resource database 74 at block 232, routine 200 proceeds to block 233, where the resource loader 72 loads the resource from the alternate resource modules 82.

If, at decision block 230, it was determined that the checksums do not match, routine 200 proceeds to block 234. Because the checksum values did not match, the resources have been modified in the default resource module 76. Accordingly, the alternate resource modules 82 are no longer compatible with the operating system 46. At block 234, the registry resource version database 74 is updated to indicate that the version of the alternate resource modules 82 is not compatible with the version of the default resource module 76. In one embodiment of the present information, the compatibility information for the version of the alternate resource modules 82 and the version of the default resource module 76 is stored as a false value in the registry resource version database 74. In this way, routine 200 can use the compatibility information stored in the registry resource database 74 to determine the resource compatibility whenever the same versions of default resource module 76 and alternate resource modules 82 are thereafter loaded. After updating the compatibility information in the registry resource version database 74 at block 234, routine 200 proceeds to block 235, where the resource loader 72 loads the resource from the default resource module 76. At this point, the routine 200 terminates at block 236.

Referring back to FIG. 2B, until an update occurs, the resource loader 72 utilizes the compatibility information in the registry resource version database 74 to dynamically verify compatibility of the alternate resource modules 82 with the current default resource module 76. In accordance with an embodiment of the present invention, the resource loader 72 performs the additional processing steps shown in FIG. 2C only when an update has occurred and version information has changed, in which case it becomes necessary to determine whether the contents of the default and alternate resource modules remain compatible. The present invention facilitates the utilization of MUI resource modules by dynamically verifying the compatibility of resources within the alternate resource modules 82 with the most current version of the operating system 70. In the event that the operating system 70 is upgraded without affecting compatibility with resources in the alternate resource modules 82, the resource loader 72 of the present invention will continue to load and utilize resources from alternate resource modules 82, thereby continuing to provide MUI functionality even though the version information of the resource modules may differ from that of the operating system.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for dynamically verifying resource compatibility with an operating system, the method comprising:
   obtaining a request to load a resource from an alternate resource module, wherein the alternate resource module corresponds to a selected language specific interface of an operating system;
   obtaining a first resource content of a default resource module from which the alternate resource module was localized;
   obtaining a second resource content of a current default resource module; determining whether the alternate resource module is compatible with an upgrade to the operating system based on comparing the first resource content and the second resource content, wherein determining whether the alternate resource module is compatible with the upgrade to the operating system includes comparing a first checksum of the first resource content to a second checksum of the second resource content to determine whether the first checksum matches the second checksum;
   if the first checksum matches the second checksum, updating operating system upgrade compatibility information in a registry resource version database to indicate the alternate module is compatible with the upgrade to the operating system and loading the requested resource from the alternate resource module; and if the first checksum does not match the second checksum, updating the operating system upgrade compatibility information to indicate the alternate module is not compatible with the upgrade to the operating system and loading the requested resource from the current default resource module.

2. The method of claim 1, wherein the alternate resource module corresponds to a selected interface language, and wherein the alternate resource module is language specific.

3. The method of claim 1, wherein the checksum is a unique number.

4. The method of claim 3, wherein obtaining the second resource content includes obtaining the second checksum from the current default resource module.

5. The method of claim 3, wherein obtaining the second resource content includes calculating the second checksum from the current default resource module.

6. The method of claim 3, wherein obtaining the first resource content includes obtaining the first checksum from the default resource module.

7. The method of claim 1, wherein determining whether the alternate resource module is compatible with the operating system includes determining that the compatibility information indicates that the first checksum matches the second checksum.

8. The method of claim 1, wherein the alternate resource module is selected by the user.

9. A computer-readable storage medium having stored computer-executable modules, comprising:
- a resource loader module for loading a resource from a resource module in a multilingual operating system;
- a current default resource module including at least one resource having a first resource content and a first checksum representation of the first resource content;
- and an alternate resource module including one or more resources localized from a default resource module having a second resource content from which the one or more resources in the alternate resource module were localized, the alternate resource module including a second checksum of the second resource content;

wherein the resource loader loads the resource from the alternate resource module when the alternate resource module is compatible with an upgrade to the operating system, wherein the alternate resource module is compatible with the upgrade to the operating system when the first checksum matches the second checksum and when the first checksum and the second checksum are a same unique number;

wherein if the first checksum matches the second checksum, the resource loader updates operating system upgrade compatibility information in a registry resource version database to indicate the alternate module is compatible with the upgrade to the operating system and loads the requested resource from the alternate resource module; and wherein if the first checksum does not match the second checksum, the resource loader updates the operating system upgrade compatibility information to indicate the alternate module is not compatible with the upgrade to the operating system and loads the requested resource from the current default resource module.

10. The computer-readable medium of claim 9, wherein the alternate resource module corresponds to a user-selected interface language and the one or more resources are language specific.

\* \* \* \* \*